United States Patent
Surnilla et al.

(10) Patent No.: US 10,605,184 B2
(45) Date of Patent: Mar. 31, 2020

(54) METHODS AND SYSTEMS FOR ADJUSTING ENGINE AIRFLOW BASED ON OUTPUT FROM AN OXYGEN SENSOR

(71) Applicant: Ford Global Technologies, LLC, Dearborn, MI (US)

(72) Inventors: Gopichandra Surnilla, West Bloomfield, MI (US); Michael Howard Shelby, Plymouth, MI (US); James Alfred Hilditch, Canton, MI (US); Jason Williams, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 208 days.

(21) Appl. No.: 15/595,638

(22) Filed: May 15, 2017

(65) Prior Publication Data
US 2017/0248089 A1    Aug. 31, 2017

Related U.S. Application Data

(62) Division of application No. 14/063,896, filed on Oct. 25, 2013, now Pat. No. 9,683,497.

(51) Int. Cl.
*F02D 41/00* (2006.01)
*F02D 41/14* (2006.01)
(Continued)

(52) U.S. Cl.
CPC ........ *F02D 41/0072* (2013.01); *F02D 11/105* (2013.01); *F02D 21/08* (2013.01); *F02D 37/02* (2013.01); *F02D 41/0007* (2013.01); *F02D 41/144* (2013.01); *F02D 41/1454* (2013.01); *F02P 5/045* (2013.01); *F02P 5/1516* (2013.01);
(Continued)

(58) Field of Classification Search
CPC .... F02D 41/0072; F02D 11/105; F02D 21/08; F02D 37/02; F02D 41/0007; F02D 41/144; F02D 41/1454; F02D 11/06; F02D 11/10; F02D 21/06; F02D 41/0002; F02D 41/0025; F02D 41/0047; F02D 41/0065; F02D 41/02; F02D 41/14; F02D 41/1438; F02D 41/1439; F02D 41/1444; F02D 2021/083; F02D 2041/0075; F02D 2200/02; F02D 2200/04; F02D 2200/0418; F02D 2200/60; F02D 2200/602; F02P 5/045; F02P 5/1516; F02P 5/04; F02P 5/145; F02P 5/15;
(Continued)

(56) References Cited

U.S. PATENT DOCUMENTS 4,248,193 A * 2/1981 Choma ................... F02D 3/00
123/350
4,614,175 A * 9/1986 Asayama ............ F02D 41/0052
123/568.26
(Continued)

*Primary Examiner* — Phutthiwat Wongwian
*Assistant Examiner* — Susan E Scharpf
(74) *Attorney, Agent, or Firm* — Geoffrey Brumbaugh; McCoy Russell LLP

(57) ABSTRACT

Methods and systems are provided for adjusting a throttle based on an intake oxygen sensor output. In one example, a method may include adjusting a position of a throttle based on a dilution threshold and a total aircharge dilution level, the total dilution aircharge level based on an output of an intake oxygen sensor. Additionally, spark timing may be adjusted based on the total aircharge dilution level.

6 Claims, 3 Drawing Sheets

(51) Int. Cl.
*F02P 5/04* (2006.01)
*F02P 5/15* (2006.01)
*F02D 11/10* (2006.01)
*F02D 21/08* (2006.01)
*F02D 37/02* (2006.01)
*F02D 11/06* (2006.01)
*F02D 21/06* (2006.01)
*F02D 41/02* (2006.01)
*F02P 5/145* (2006.01)

(52) U.S. Cl.
CPC .............. *F02D 11/06* (2013.01); *F02D 11/10* (2013.01); *F02D 21/06* (2013.01); *F02D 41/0002* (2013.01); *F02D 41/0025* (2013.01); *F02D 41/0047* (2013.01); *F02D 41/0065* (2013.01); *F02D 41/02* (2013.01); *F02D 41/14* (2013.01); *F02D 41/1438* (2013.01); *F02D 41/1439* (2013.01); *F02D 41/1444* (2013.01); *F02D 2021/083* (2013.01); *F02D 2041/0075* (2013.01); *F02D 2200/02* (2013.01); *F02D 2200/04* (2013.01); *F02D 2200/0418* (2013.01); *F02D 2200/60* (2013.01); *F02D 2200/602* (2013.01); *F02P 5/04* (2013.01); *F02P 5/145* (2013.01); *F02P 5/15* (2013.01); *F02P 5/1502* (2013.01); *Y02T 10/144* (2013.01); *Y02T 10/46* (2013.01); *Y02T 10/47* (2013.01)

(58) Field of Classification Search
CPC ...... F02P 5/1502; Y02T 10/144; Y02T 10/46; Y02T 10/47
USPC ........................................................ 123/349
See application file for complete search history.

(56) References Cited

U.S. PATENT DOCUMENTS

| | | | |
|---|---|---|---|
| 4,635,609 A | | 1/1987 | Seppen et al. |
| 4,691,677 A | | 9/1987 | Hotate et al. |
| 4,727,849 A | * | 3/1988 | Nishida ............... F02D 41/0052 123/568.27 |
| 5,150,696 A | | 9/1992 | Kabasin et al. |
| 5,201,303 A | * | 4/1993 | Kojima ............... F02D 41/0072 123/568.26 |
| 5,261,373 A | | 11/1993 | Ohsuga et al. |
| 5,483,934 A | | 1/1996 | Stutzenberger |
| 5,623,906 A | * | 4/1997 | Storhok ................. F02D 37/02 123/399 |
| 6,079,629 A | * | 6/2000 | Morikawa ............. B60H 1/032 237/12.3 C |
| 6,176,227 B1 | | 1/2001 | Ohuchi et al. |
| 6,367,462 B1 | | 4/2002 | McKay et al. |
| 6,742,379 B2 | | 6/2004 | Matsubara et al. |
| 6,948,475 B1 | * | 9/2005 | Wong ..................... F02B 43/00 123/299 |
| 7,032,580 B2 | | 4/2006 | Suzuki |
| 8,078,384 B2 | | 12/2011 | Glugla et al. |
| 8,191,514 B2 | | 6/2012 | Czekala et al. |
| 9,051,890 B2 | * | 6/2015 | Surnilla ................. F02B 29/04 |
| 9,163,575 B2 | | 10/2015 | Pursifull |
| 9,435,251 B2 | * | 9/2016 | Surnilla ............. F02D 41/0007 |
| 9,650,946 B2 | * | 5/2017 | Rollinger ........... F02B 29/0468 |
| 2008/0114521 A1 | * | 5/2008 | Doering ................ B60W 30/16 701/96 |
| 2008/0120175 A1 | * | 5/2008 | Doering .............. B60R 16/0236 705/14.67 |
| 2009/0055076 A1 | * | 2/2009 | Onishi ............... F02D 41/1458 701/103 |
| 2009/0099755 A1 | | 4/2009 | Harbert |
| 2010/0037876 A1 | * | 2/2010 | Robinson ................ F01L 1/047 123/65 PE |
| 2010/0058832 A1 | * | 3/2010 | Onishi .................... F01N 9/002 73/23.31 |
| 2010/0319444 A1 | | 12/2010 | Miyaura et al. |
| 2011/0132284 A1 | | 6/2011 | Leone et al. |
| 2011/0144881 A1 | | 6/2011 | Glugla et al. |
| 2011/0315128 A1 | * | 12/2011 | Yokoo ................. F02D 13/0246 123/568.11 |
| 2012/0023937 A1 | | 2/2012 | Styles et al. |
| 2012/0037134 A1 | * | 2/2012 | Jankovic ............ F02D 41/0002 123/568.21 |
| 2012/0291760 A1 | | 11/2012 | Vigild et al. |
| 2012/0291762 A1 | | 11/2012 | Vigild et al. |
| 2012/0297765 A1 | | 11/2012 | Vigild et al. |
| 2013/0000278 A1 | | 1/2013 | Dubkov et al. |
| 2013/0118461 A1 | | 5/2013 | Mitchell et al. |
| 2013/0197775 A1 | * | 8/2013 | Szwabowski ......... F02D 11/105 701/101 |
| 2013/0213353 A1 | | 8/2013 | Rollinger et al. |
| 2013/0275030 A1 | | 10/2013 | Kim et al. |
| 2013/0333663 A1 | | 12/2013 | Chen et al. |
| 2014/0102428 A1 | | 4/2014 | Fulton et al. |
| 2014/0109568 A1 | * | 4/2014 | Glugla .................... F02D 41/10 60/599 |
| 2014/0109870 A1 | * | 4/2014 | Glugla ................ F02B 29/0406 123/406.11 |
| 2014/0109871 A1 | * | 4/2014 | Glugla ................ F02B 29/0468 123/406.19 |
| 2014/0174073 A1 | | 6/2014 | Kamik et al. |
| 2014/0196697 A1 | * | 7/2014 | Burrahm ................ F02M 26/43 123/568.11 |
| 2014/0202435 A1 | | 7/2014 | Hilditch et al. |
| 2014/0331643 A1 | | 11/2014 | Reich et al. |
| 2015/0033735 A1 | | 2/2015 | Makki et al. |
| 2015/0047339 A1 | * | 2/2015 | Rollinger ............ F02B 29/0468 60/599 |
| 2015/0076134 A1 | | 3/2015 | Surnilla et al. |
| 2015/0101534 A1 | | 4/2015 | Pan et al. |
| 2015/0114346 A1 | | 4/2015 | Surnilla et al. |
| 2015/0121864 A1 | | 5/2015 | Surnilla et al. |

\* cited by examiner

METHODS AND SYSTEMS FOR ADJUSTING ENGINE AIRFLOW BASED ON OUTPUT FROM AN OXYGEN SENSOR

CROSS REFERENCE TO RELATED APPLICATION

The present application is a divisional of U.S. patent application Ser. No. 14/063,896, entitled "METHODS AND SYSTEMS FOR ADJUSTING ENGINE AIRFLOW BASED ON OUTPUT FROM AN OXYGEN SENSOR," filed on Oct. 25, 2013. The entire contents of the above-referenced application are hereby incorporated by reference in their entirety for all purposes.

BACKGROUND/SUMMARY

Engine systems may utilize recirculation of exhaust gas from an engine exhaust system to an engine intake system (intake passage), a process referred to as exhaust gas recirculation (EGR), to reduce regulated emissions and improve fuel economy. An EGR system may include various sensors to measure and/or control the EGR. As one example, the EGR system may include an intake gas constituent sensor, such as an oxygen sensor, which may be employed during non-EGR conditions to determine the oxygen content of fresh intake air. During EGR conditions, the sensor may be used to infer EGR based on a change in oxygen concentration due to addition of EGR as a diluent. One example of such an intake oxygen sensor is shown by Matsubara et al. in U.S. Pat. No. 6,742,379. The EGR system may additionally or optionally include an exhaust gas oxygen sensor coupled to the exhaust manifold for estimating a combustion air-fuel ratio.

As such, due to the location of the oxygen sensor downstream of a charge air cooler (CAC) in the intake manifold, the sensor may be sensitive to the presence of water vapor and other diluents in the charge air flow. For example, during certain operating conditions such as increased charge airflow, condensate formed within the CAC may be released as water droplets into the charge airflow. Water droplets at the oxygen sensor may be incorrectly interpreted as EGR, thereby resulting in an overestimate of EGR. As a result, the aircharge required to deliver the desired torque may be overestimated and result in incorrect throttle control.

In one example, the issues described above may be addressed by a method for an engine comprising adjusting a position of a throttle based on a dilution threshold when a total aircharge dilution level is greater than the dilution threshold, the total aircharge dilution level based on an output of an intake oxygen sensor. In one example, an estimated EGR rate may be determined based on the total aircharge dilution level, assuming EGR is the major diluent in the aircharge.

As one example, a dilution threshold may be based on a saturation vapor pressure at a throttle inlet temperature. The dilution threshold may be further based on a target EGR rate when EGR is flowing (e.g., when an EGR valve is open). When the total aircharge dilution level (e.g., decrease in intake oxygen due to diluents in the aircharge) is less than the dilution threshold, the throttle may be adjusted based on the total aircharge dilution level. However, when the total aircharge dilution level is greater than the dilution threshold, water droplets may be in the aircharge and increasing the dilution level. As a result, the throttle may be adjusted based on the dilution threshold rather than the higher total aircharge dilution level. Spark timing may be adjusted based on the total aircharge dilution level even when the total aircharge dilution level is greater than the dilution threshold. In this way, the aircharge required to deliver the desired torque may not be overestimated, thereby resulting in the engine delivering the demanded torque.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
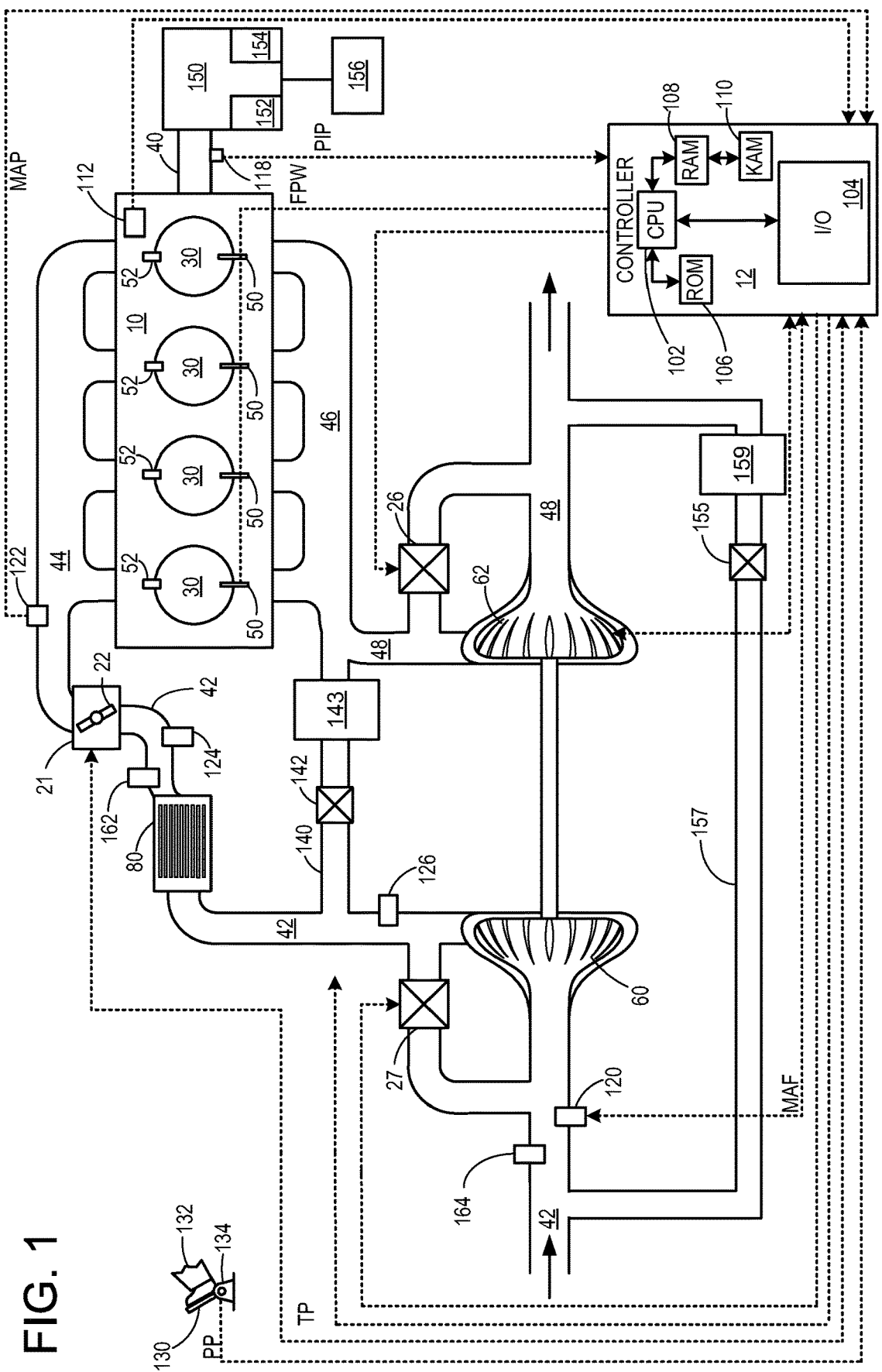
FIG. 1 is a schematic diagram of an example engine system including an intake oxygen sensor and charge air cooler.
Figure 2:
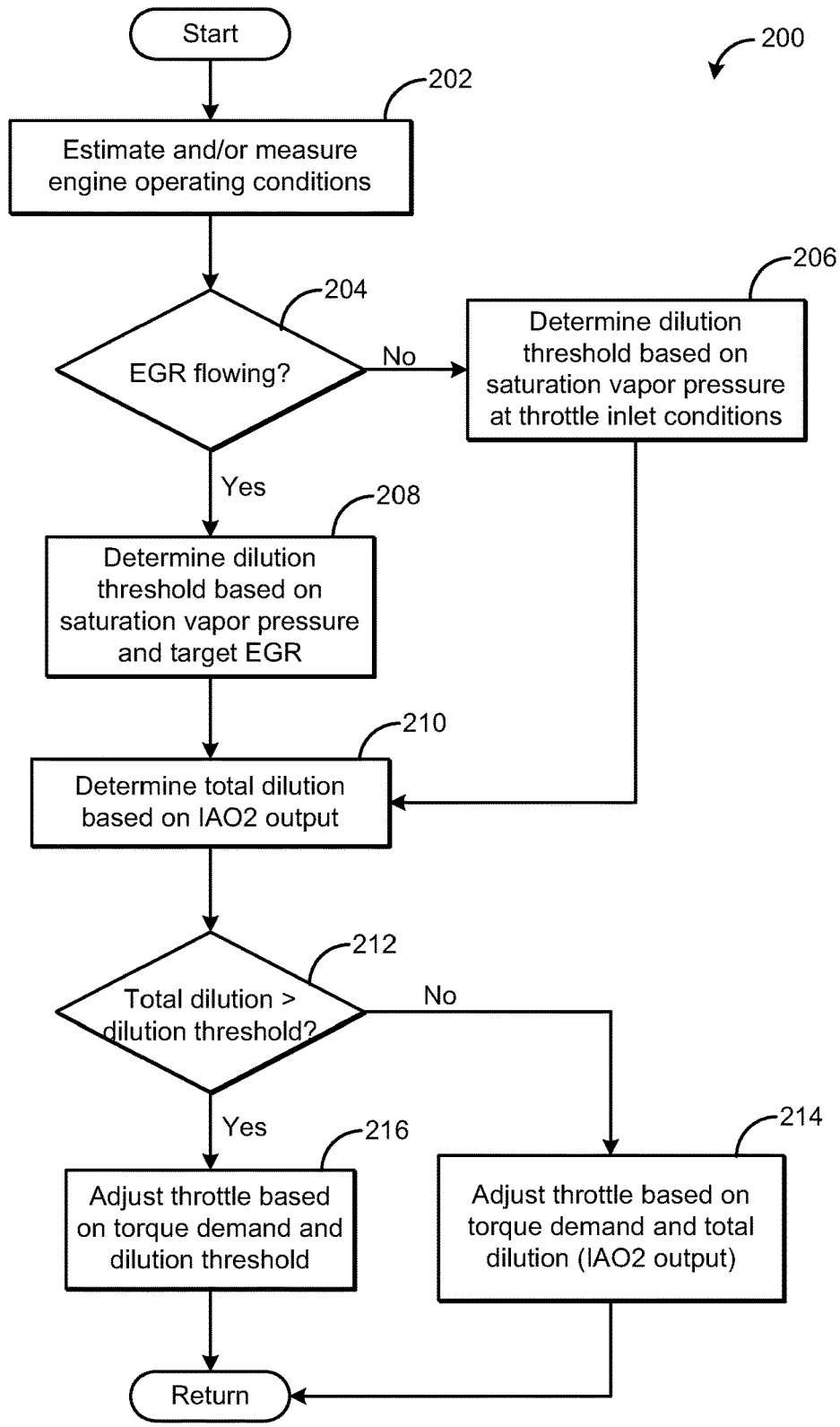
FIG. 2 is a flow chart of a method for adjusting a throttle based on an oxygen sensor output.
Figure 3:
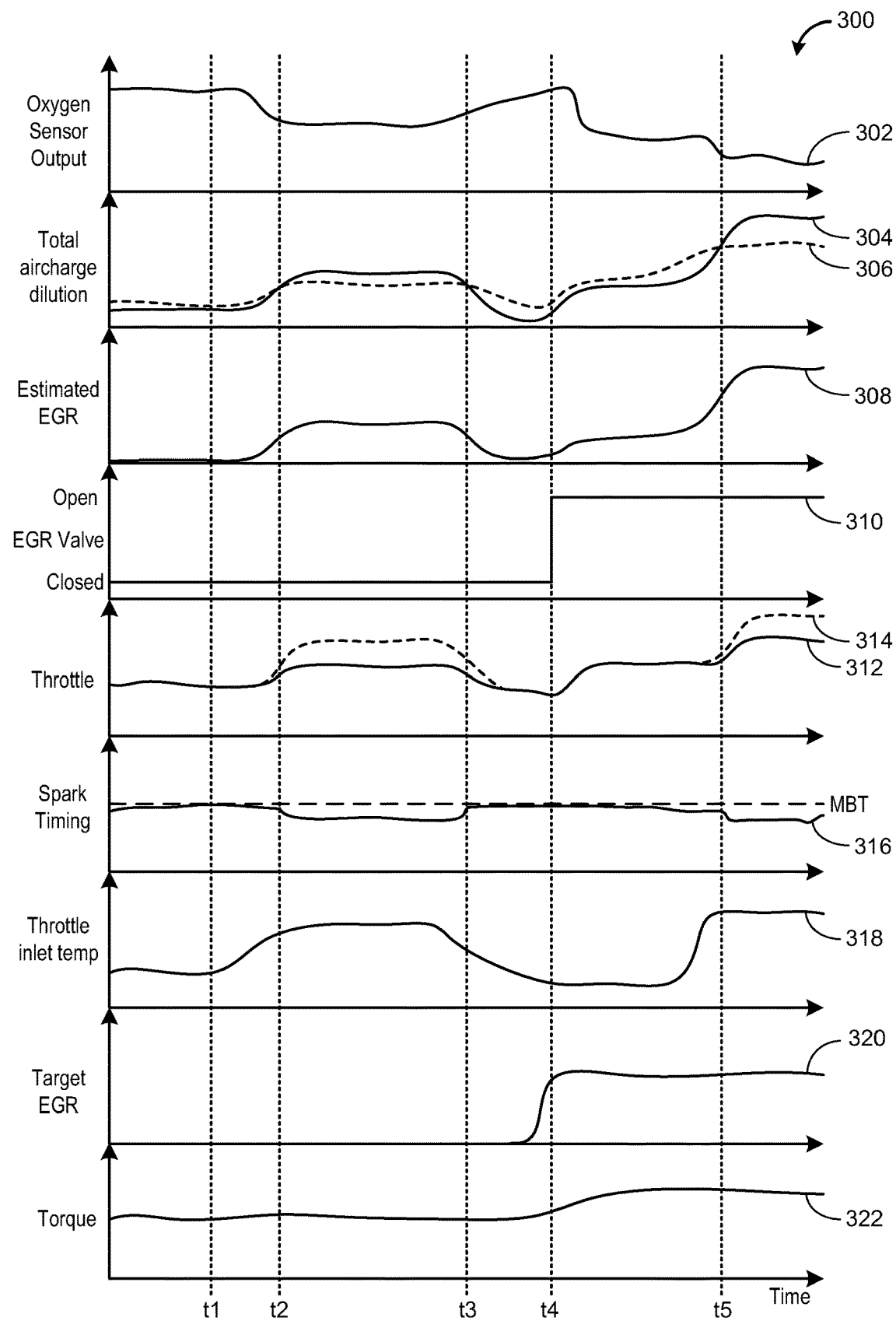
FIG. 3 shows a graph illustrating example adjustments to a throttle and spark timing based on an intake oxygen sensor output.

The following description relates to systems and methods for adjusting an intake throttle based on an output of an intake oxygen sensor. In one example, the intake oxygen sensor may be positioned within an intake air duct or passage, downstream of a charge air cooler (CAC) and upstream of the throttle, as shown in FIG. 1. The output of the intake oxygen sensor may include an estimate of the oxygen concentration of the intake aircharge. Diluents in the aircharge, such as EGR, may decrease the oxygen concentration measured at the intake oxygen sensor. As a result, an EGR rate may be estimated from the intake oxygen sensor output based on the dilution. However, additional diluents in the aircharge such as water vapor and/or water droplets may also decrease the oxygen concentration and increase the total aircharge dilution level. If the estimated EGR rate is assumed to be the total aircharge dilution level, the EGR rate may be overestimated when water droplets are in the intake aircharge. In one example, during condensing conditions, water may be released into the aircharge from the CAC. A dilution threshold may be determined based on a saturation vapor pressure at throttle inlet conditions. If the total aircharge dilution level measured at the intake oxygen sensor increases above the dilution threshold, water droplets may be in the intake airflow. During condensing conditions when the total aircharge dilution is above the dilution threshold, an engine controller may adjust a throttle position based on the dilution threshold instead of the higher total aircharge dilution (e.g., equivalent estimated EGR). A method for adjusting the throttle based on the total aircharge dilution, the dilution threshold, and EGR flow is shown at FIG. 2. Example adjustments to throttle position and spark timing in response to changing total aircharge dilution levels are shown at FIG. 3.

FIG. 1 is a schematic diagram showing an example engine 10, which may be included in a propulsion system of an automobile. The engine 10 is shown with four cylinders or combustion chambers 30. However, other numbers of cylinders may be used in accordance with the current disclosure. Engine 10 may be controlled at least partially by a control system including a controller 12, and by input from a vehicle operator 132 via an input device 130. In this example, the input device 130 includes an accelerator pedal and a pedal position sensor 134 for generating a proportional pedal position signal PP. Each combustion chamber (e.g., cylinder) 30 of the engine 10 may include combustion chamber walls with a piston (not shown) positioned therein. The pistons may be coupled to a crankshaft 40 so that reciprocating motion of the piston is translated into rotational motion of the crankshaft. The crankshaft 40 may be coupled to at least one drive wheel of a vehicle via an intermediate transmission system 150. Further, a starter motor may be coupled to crankshaft 40 via a flywheel to enable a starting operation of engine 10. The crankshaft 40 may also be used to drive an alternator (not shown in FIG. 1).

An engine output torque may be transmitted to a torque converter (not shown) to drive the automatic transmission system 150. Further, one or more clutches may be engaged, including forward clutch 154, to propel the automobile. In one example, the torque converter may be referred to as a component of the transmission system 150. Further, transmission system 150 may include a plurality of gear clutches 152 that may be engaged as needed to activate a plurality of fixed transmission gear ratios. Specifically, by adjusting the engagement of the plurality of gear clutches 152, the transmission may be shifted between a higher gear (that is, a gear with a lower gear ratio) and a lower gear (that is, a gear with a higher gear ratio). As such, the gear ratio difference enables a lower torque multiplication across the transmission when in the higher gear while enabling a higher torque multiplication across the transmission when in the lower gear. The vehicle may have four available gears, where transmission gear four (transmission fourth gear) is the highest available gear and transmission gear one (transmission first gear) is the lowest available gear. In other embodiments, the vehicle may have more or less than four available gears. As elaborated herein, a controller may vary the transmission gear (e.g., upshift or downshift the transmission gear) to adjust an amount of torque conveyed across the transmission and torque converter to vehicle wheels 156 (that is, an engine shaft output torque).

As the transmission shifts to a lower gear, the engine speed (Ne or RPM) increases, increasing engine airflow. An intake manifold vacuum generated by the spinning engine may be increased at the higher RPM. In some examples, as discussed further below, downshifting may be used to increase engine airflow and purge condensate built up in a charge air cooler (CAC) 80.

The combustion chambers 30 may receive intake air from the intake manifold 44 and may exhaust combustion gases via an exhaust manifold 46 to an exhaust passage 48. The intake manifold 44 and the exhaust manifold 46 can selectively communicate with the combustion chamber 30 via respective intake valves and exhaust valves (not shown). In some embodiments, the combustion chamber 30 may include two or more intake valves and/or two or more exhaust valves.

Fuel injectors 50 are shown coupled directly to the combustion chamber 30 for injecting fuel directly therein in proportion to the pulse width of signal FPW received from controller 12. In this manner, the fuel injector 50 provides what is known as direct injection of fuel into the combustion chamber 30; however it will be appreciated that port injection is also possible. Fuel may be delivered to the fuel injector 50 by a fuel system (not shown) including a fuel tank, a fuel pump, and a fuel rail.

In a process referred to as ignition, the injected fuel is ignited by known ignition means such as spark plug 52, resulting in combustion. Spark ignition timing may be controlled such that the spark occurs before (advanced) or after (retarded) the manufacturer's specified time. For example, spark timing may be retarded from maximum break torque (MBT) timing to control engine knock or advanced under high humidity conditions. In particular, MBT may be advanced to account for the slow burn rate. In one example, spark may be retarded during a tip-in. In an alternate embodiment, compression ignition may be used to ignite the injected fuel.

The intake manifold 44 may receive intake air from an intake passage 42. The intake passage 42 and/or intake manifold 44 includes a throttle 21 having a throttle plate 22 to regulate flow to the intake manifold 44. In this particular example, the position (TP) of the throttle plate 22 may be varied by the controller 12 to enable electronic throttle control (ETC). In this manner, the throttle 21 may be operated to vary the intake air provided to the combustion chambers 30. For example, the controller 12 may adjust the throttle plate 22 to increase an opening of the throttle 21. Increasing the opening of the throttle 21 may increase the amount of air supplied to the intake manifold 44. In an alternate example, the opening of the throttle 21 may be decreased or closed completely to shut off airflow to the intake manifold 44. In some embodiments, additional throttles may be present in intake passage 42, such as a throttle upstream of a compressor 60 (not shown).

Further, in the disclosed embodiments, an exhaust gas recirculation (EGR) system may route a desired portion of exhaust gas from the exhaust passage 48 to the intake passage 42 via an EGR passage, such as high pressure EGR passage 140. The amount of EGR provided to the intake passage 42 may be varied by the controller 12 via an EGR valve, such as high pressure EGR valve 142. Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger through EGR passage 140. FIG. 1 also shows a low pressure EGR system where EGR is routed from downstream of turbine of a turbocharger to upstream of a compressor of a turbocharger through low pressure EGR passage 157. A low pressure EGR valve 155 may control the amount of EGR provided to the intake passage 42. In some embodiments, the engine may include both a high pressure EGR and a low pressure EGR system, as shown in FIG. 1. In other embodiments, the engine may include either a low pressure EGR system or a high pressure EGR system. When operable, the EGR system may induce the formation of condensate from the compressed air, particularly when the compressed air is cooled by the charge air cooler, as described in more detail below. For example, the low pressure EGR passage 157 may include a low pressure EGR cooler 159 and the high pressure EGR passage 140 may include a high pressure EGR cooler 143.

The engine 10 may further include a compression device such as a turbocharger or supercharger including at least a compressor 60 arranged along the intake passage 42. For a turbocharger, the compressor 60 may be at least partially driven by a turbine 62, via, for example a shaft, or other coupling arrangement. The turbine 62 may be arranged along the exhaust passage 48. Various arrangements may be provided to drive the compressor. For a supercharger, the compressor 60 may be at least partially driven by the engine and/or an electric machine, and may not include a turbine. Thus, the amount of compression provided to one or more cylinders of the engine via a turbocharger or supercharger may be varied by the controller 12.

In the embodiment shown in FIG. 1, the compressor 60 may be driven primarily by the turbine 62. The turbine 62 may be driven by exhaust gases flowing through the exhaust passage 48. Thus, the driving motion of the turbine 62 may drive the compressor 60. As such, the speed of the compressor 60 may be based on the speed of the turbine 62. As the speed of the compressor 60 increases, more boost may be provided through the intake passage 42 to the intake manifold 44.

Further, the exhaust passage 48 may include a wastegate 26 for diverting exhaust gas away from the turbine 62. Additionally, the intake passage 42 may include a compressor bypass or recirculation valve (CRV) 27 configured to divert intake air around the compressor 60. The wastegate 26 and/or the CRV 27 may be controlled by the controller 12 to be opened when a lower boost pressure is desired, for example. For example, in response to compressor surge or a potential compressor surge event, the controller 12 may open the CBV 27 to decrease pressure at the outlet of the compressor 60. This may reduce or stop compressor surge.

The intake passage 42 may further include a charge air cooler (CAC) 80 (e.g., an intercooler) to decrease the temperature of the turbocharged or supercharged intake gases. In some embodiments, the CAC 80 may be an air to air heat exchanger. In other embodiments, the CAC 80 may be an air to liquid heat exchanger. The CAC 80 may also be a variable volume CAC. Hot charge air (boosted air) from the compressor 60 enters the inlet of the CAC 80, cools as it travels through the CAC, and then exits to pass through the throttle 21 and then enter the engine intake manifold 44. Ambient air flow from outside the vehicle may enter engine 10 through a vehicle front end and pass across the CAC, to aid in cooling the charge air. Condensate may form and accumulate in the CAC when the ambient air temperature decreases, or during humid or rainy weather conditions, where the charge air is cooled below the water dew point temperature. Further, when the charge air entering the CAC is boosted (e.g., boost pressure and/or CAC pressure is greater than atmospheric pressure), condensate may form if the CAC temperature falls below the dew point temperature. When the charge air includes recirculated exhaust gasses, the condensate can become acidic and corrode the CAC housing. The corrosion can lead to leaks between the air charge, the atmosphere, and possibly the coolant in the case of water-to-air coolers. Further, if condensate builds up in the CAC, it may be ingested by the engine during times of increased airflow. As a result, unstable combustion and/or engine misfire may occur.

The engine 10 may further include one or more oxygen sensors positioned in the intake passage 42 and/or the intake manifold 44. As such, the one or more oxygen sensors may be referred to as intake oxygen sensors. In the depicted embodiment, an oxygen sensor 162 is positioned downstream of the CAC 80 and upstream of the throttle 21. In another example, the oxygen sensor 162 may be positioned downstream of the CAC 80 outlet and downstream of the throttle 21. In yet other embodiments, the oxygen sensor 162 or a second oxygen sensor may be positioned at the inlet of the CAC. An oxygen sensor may also be positioned in the intake passage 42 between an outlet of the low pressure EGR passage 157 and an inlet to the compressor 60.

Intake oxygen sensor 162 may be any suitable sensor for providing an indication of the oxygen concentration of the charge air (e.g., air flowing through the intake passage 42), such as a linear oxygen sensor, intake UEGO (universal or wide-range exhaust gas oxygen) sensor, two-state oxygen sensor, etc. In one example, the intake oxygen sensor 162 may be an intake oxygen sensor including a heated element as the measuring element.

As elaborated herein, the intake oxygen sensor 162 may be configured to provide an estimate regarding the oxygen content of fresh air (e.g., aircharge) received in the intake manifold. A pressure sensor 124 may be positioned alongside the oxygen sensor 162 for estimating an intake pressure at which an output of the oxygen sensor 162 is received. Since the output of the oxygen sensor 162 is influenced by the intake pressure, a reference oxygen sensor output may be learned at a reference intake pressure. In one example, the reference intake pressure is a throttle inlet pressure (TIP) where pressure sensor 124 is a TIP sensor. In alternate examples, the reference intake pressure is a manifold pressure (MAP) as sensed by MAP sensor 122. Additionally, the intake passage 42 may include a humidity sensor 164 configured to estimate a relative humidity of the intake air. In one embodiment, the humidity sensor 164 is a UEGO sensor configured to estimate the relative humidity of the intake air based on the output of the sensor at one or more voltages. In some examples, the output of the oxygen sensor 162 may be corrected based on the output of the humidity sensor 164.

Further, the intake oxygen sensor 162 may be used for estimating the intake oxygen concentration, total aircharge dilution, and inferring an amount of EGR flow through the engine based on a change in the intake oxygen concentration when EGR is flowing (e.g., upon opening the EGR valve 142 or 155). Specifically, a change in the output of the oxygen sensor 162 upon opening the EGR valve 142 or 155 is compared to a reference point where the sensor is operating with no EGR (the zero point). Based on the change (e.g., decrease) in oxygen amount from the time of operating with no EGR, an EGR flow currently provided to the engine can be calculated. For example, upon applying a reference voltage (Vs) to the sensor, a pumping current (Ip) is output by the sensor. The change in oxygen concentration may be proportional to the change in pumping current (delta Ip) output by the sensor in the presence of EGR relative to sensor output in the absence of EGR (the zero point). Based on a deviation of the estimated EGR flow from the expected (or target) EGR flow, further EGR control may be performed.

For example, when EGR is flowing, the change in oxygen concentration at the oxygen sensor 162 may be used to infer the EGR amount or flow rate which may then be used for EGR flow adjustments (via the EGR valve 142 and/or 155), spark timing adjustments, and/or throttle position adjustments. For example, controller 12 may estimate the percent dilution of the EGR flow based on feedback from the oxygen sensor 162. In some examples, the controller 12 may then adjust one or more of EGR valve 142, EGR valve 155, throttle 21, CRV 27, and/or wastegate 26 to achieve a desired EGR dilution percentage of the intake air. In another example, the controller may determine a total aircharge dilution (whether EGR is flowing or not) representing to total percent dilution of the aircharge due to diluents in the airflow (including EGR, water vapor, and water droplets). In some examples, the controller 12 may assume to total aircharge dilution to be EGR. The controller may then adjust one or more of EGR valve 142, EGR valve 155, throttle 21, CRV 27, and/or wastegate 26 to achieve a desired total aircharge dilution percentage of the intake air.

During conditions when water is released from the CAC into the charge air flow, water in the form of droplets may contact the oxygen sensor 162. When water hits the sensor, the heated element of the oxygen sensor 162 may evaporate the water and measure it as a local vapor or diluent in the charge air flow. As discussed further below, this may cause the intake oxygen measured at the oxygen sensor 162 to decrease. As a result, when EGR is flowing, EGR flow based on the intake oxygen measured at the oxygen sensor 162 may be overestimated. When EGR is not flowing, the total aircharge dilution level may be overestimated. The overestimated EGR and/or total aircharge dilution may result in inaccurate throttle adjustments that may increase airflow to the engine to a higher level than required for the torque demand.

The controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. The controller 12 may receive various signals from sensors coupled to the engine 10 for performing various functions to operate the engine 10. In addition to those signals previously discussed, these signals may include measurement of inducted mass air flow from MAF sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by the controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, the Hall effect sensor 118, which is also used as an engine speed sensor, may produce a predetermined number of equally spaced pulses every revolution of the crankshaft 40.

Other sensors that may send signals to controller 12 include the pressure sensor 124 at an outlet of a charge air cooler 80, the oxygen sensor 162, the humidity sensor 164, and a boost pressure sensor 126. In one example, the pressure sensor 124 may also be a temperature sensor. Other sensors not depicted may also be present, such as a sensor for determining the intake air velocity at the inlet of the charge air cooler, and other sensors. In some examples, storage medium read-only memory chip 106 may be programmed with computer readable data representing instructions executable by microprocessor unit 102 for performing the methods described below as well as other variants that are anticipated but not specifically listed. Example routines are described herein at FIG. 2.

The system of FIG. 1 provides for an engine system including an intake manifold, a charge air cooler positioned in an intake passage upstream of the intake manifold, an intake throttle coupled to the intake manifold downstream of the charge air cooler, an exhaust gas recirculation (EGR) system including a passage for recirculating exhaust residuals from an exhaust passage to an intake passage via an EGR valve, and an oxygen sensor coupled to the intake passage, downstream of the charge air cooler and upstream of the intake throttle. The engine system further includes a controller with computer readable instructions for adjusting a position of the intake throttle based on a total aircharge dilution relative to a dilution threshold, the total aircharge dilution based on an output of the oxygen sensor. In one example, adjusting the position of the intake throttle includes adjusting the position of the intake throttle based on the total aircharge dilution when the total aircharge dilution is less than the dilution threshold. In another example, adjusting the position of the intake throttle includes adjusting the position of the intake throttle based on the dilution threshold when the total aircharge dilution is greater than the dilution threshold.

The dilution threshold is based on a saturation vapor pressure at intake throttle inlet conditions and a target EGR flow rate when the EGR valve is open and based on only the saturation vapor pressure at the intake throttle inlet conditions when the EGR valve is closed. In one example, throttle intake inlet conditions includes a temperature downstream of the charge air cooler and upstream of the intake throttle.

As previously discussed, the intake air oxygen sensor 162 can be used to measure the amount of EGR in the intake aircharge (or total aircharge dilution) as a function of the amount of change in oxygen content due to the addition of EGR as a diluent. During operation, a pumping current of the intake oxygen sensor 162 may be indicative of an amount of oxygen in the gas flow. Thus, as more EGR is introduced, the sensor may output a reading or pumping current corresponding to a lower oxygen concentration. During the estimation, a nominal reference voltage (e.g., at 450 mV), or Nernst voltage, is applied to the sensor and an output (e.g., a pumping current output by the sensor upon application of the lower reference voltage) is noted. Based on the output of the sensor relative to a zero point of the sensor (that is, sensor output at no EGR conditions), a change in oxygen concentration is learned, and an intake dilution with EGR is inferred.

However, if the EGR estimation is performed during conditions when condensate in the form of water droplets is being released from the CAC, the output of the sensor corresponds to both EGR and water as diluents in the charge air flow. Upon contact with the oxygen sensor, water droplets in the charge air evaporate and the intake oxygen sensor measures the water droplets as EGR. This may reduce the (local) oxygen concentration read by the sensor. Since the output of the sensor and the change in oxygen concentration is used to infer an EGR dilution of intake aircharge, the reduced oxygen concentration read by the intake oxygen sensor in the presence of water droplets may be incorrectly interpreted as additional diluent. This may impact the EGR estimation and the subsequent EGR control.

EGR estimation may also affect throttle control. For example, the throttle may be adjusted based on engine operating conditions such as torque demand and the EGR estimated by the intake oxygen sensor. For example, if the EGR is higher than a target EGR rate, the controller may increase opening of the throttle in order to increase the total air flow and deliver the required aircharge for the torque demand. However, if EGR is over-estimated due to water in the charge air flow, the amount of aircharge required for the torque demand and the target EGR flow rate may be over-estimated. As a result of the increased EGR estimation, the controller may increase the opening of the throttle in an effort to increase the aircharge to the engine cylinders.

Additional engine operating parameters, such as spark timing, may also be adjusted responsive to the intake oxygen sensor output. Spark timing may also be adjusted based on the estimated EGR, or total dilution, determined at the intake oxygen sensor. For example, as the total dilution level (e.g., percentage), or estimated EGR, increases spark timing may be adjusted from MBT. During a tip-in, the controller may advance spark timing as the total dilution level increases. Alternatively, when a pedal position is relatively constant, the controller may advance spark timing as the total dilution level increases. Since water droplets may affect combustion, adjusting spark timing responsive to the total dilution (e.g., estimated EGR), even when it includes dilution due to water vapor and water droplets, may result in accurate spark timing. Thus, overestimating EGR based on the total dilution determined from the intake oxygen sensor output may still result in accurate spark timing adjustments. In another embodiment, spark timing may be adjusted based on the dilution threshold. For example, if the total dilution is greater than the dilution threshold, the controller may adjust spark based on the dilution threshold or another dilution level smaller than the total dilution level measured by the intake oxygen sensor.

During condensing conditions and/or when water is being released from the CAC, throttle adjustments based on the output of the intake oxygen sensor may be adjusted based on a dilution threshold at the throttle inlet conditions. For example, the dilution threshold may be based on the saturation water vapor pressure at the throttle inlet temperature (e.g., CAC outlet temperature) and a target EGR rate (e.g., the set EGR rate). In this way, the dilution threshold may be a more accurate estimate of the total dilution of the aircharge compared to the oxygen measurement of the oxygen sensor. If the total dilution measured at the intake oxygen sensor (e.g., estimated EGR rate) is greater than the dilution threshold, water droplets may be in the aircharge. As a result, throttle position and the aircharge may be adjusted based on the dilution threshold instead of the higher estimated EGR rate (based on the total aircharge dilution from the intake oxygen sensor output).

During conditions when EGR is flowing (e.g., an EGR valve is open), the dilution threshold may be determined based on the target (e.g., expected) EGR rate and the saturation water vapor pressure at the throttle inlet temperature. During conditions when EGR is not flowing, the dilution threshold may be determined based on only the saturation water vapor threshold since EGR may not contribute to a decrease in measured intake oxygen. In this way, when an estimated EGR flow, or total aircharge dilution level, measured at the intake oxygen sensor is greater than the dilution threshold, the controller may adjust the throttle based on the dilution threshold and not the total dilution level. However, the controller may still adjust spark timing based on the total dilution level (e.g., estimated equivalent EGR flow) based on the oxygen sensor output. In alternate embodiments, the controller may also adjust spark timing based on the dilution threshold and not the total dilution threshold. In yet other embodiments, the controller may adjust spark timing based on a calibrated blend of the dilution threshold and the total aircharge dilution. As a result, spark timing and throttle position may be adjusted to deliver the aircharge and ignition timing for the torque demand, thereby increasing engine efficiency.

Turning now to FIG. 2, a method 200 is shown for adjusting an intake throttle based on an oxygen sensor output. Specifically, the oxygen sensor may be an intake oxygen sensor (IAO2) positioned in an intake passage, downstream of the CAC and upstream of the throttle. In this position, the oxygen sensor may be sensitive to water droplets released from the CAC into the aircharge. Water droplets in the aircharge, along with EGR and vapor pressure, may all contribute to a total dilution level measured by the intake oxygen sensor. As described above, the intake oxygen sensor may measure an intake oxygen level of the aircharge. The presence of diluents such as water vapor, EGR, and/or water droplets may decrease the percentage of oxygen measured at the oxygen sensor (e.g., due to an increasing total dilution level). In some examples, the total dilution level and/or the intake oxygen measured at the oxygen sensor (e.g., the intake oxygen sensor output) may be used to determine an EGR flow rate. Engine operating parameters such as throttle position and spark timing may be at least partially adjusted based on the total dilution level, or the estimated EGR flow rate. In one example, the method 200 is executable by the controller 12 shown in FIG. 1.

Method 200 begins at 202 by estimating and/or measuring engine operating conditions. Engine operating conditions may include engine speed and load, EGR flow rate, mass air flow rate, aircharge, conditions of the charge air cooler (e.g., inlet and/or outlet temperature and pressures), throttle inlet temperature and pressure, ambient humidity, ambient temperature, torque demand, etc. At 204, the method includes determining if EGR is flowing. In one example, if the EGR valve is open, EGR may be flowing. Conversely, if the EGR valve is closed, EGR may not be flowing. If EGR is not flowing (e.g., EGR rate is substantially zero), the method continues on to 206 to determine a dilution threshold based on a saturation vapor pressure at throttle inlet conditions. As discussed above, the saturation vapor pressure may be determined (e.g., from a look-up table in the controller) at the throttle inlet conditions. In one example, the throttle inlet conditions may be a temperature downstream of the CAC and upstream of the throttle. In one example, the temperature may be determined from a temperature sensor positioned proximate to the intake oxygen sensor (IAO2). The saturation vapor pressure may then be used to estimate the dilution threshold. As such, the dilution threshold may be a maximum amount of dilution (e.g., amount of decrease in intake oxygen from an expected or base level) from the diluents in the aircharge (e.g., water vapor when EGR is not flowing), the diluents not including the water droplets. Thus, an amount of dilution over the dilution threshold may be indicative of water droplets in the aircharge (in addition to the water vapor).

Alternatively, if EGR is flowing at 204, the method continues on to 208 to determine the dilution threshold based on the saturation vapor pressure at the throttle inlet conditions and a target (e.g., expected) EGR rate. In one example, the target EGR rate may be a desired EGR based on engine operating conditions. The EGR valve may be adjusted to deliver the target EGR rate. As such, the dilution threshold when EGR is flowing may be a maximum amount of dilution from diluents in the aircharge, the diluents including EGR and water vapor. Thus, an amount of dilution over the dilution threshold may be indicative of water droplets in the aircharge, in addition to EGR and water vapor.

After determining the dilution threshold at 206 or 208, the method continues on to 210 to determine the total aircharge dilution based on the intake oxygen sensor (IAO2) output. As discussed above, the oxygen sensor output may be an intake oxygen concentration. The amount the oxygen concentration is decreased compared to a base or expected oxygen concentration may be the amount of dilution in the aircharge. Thus, the total dilution level may be a measurement of the amount of diluents (e.g., EGR, water vapor, and water droplets) in the aircharge. In some examples, an EGR rate may be determined from the intake oxygen sensor output. However, if EGR is not flowing, this may be an equivalent EGR rate which is actually due to water vapor, water droplets, or other diluents in the aircharge other than EGR. In some embodiments, the equivalent EGR rate may be compared to an equivalent EGR threshold (based on the saturation vapor pressure and similar to the dilution threshold) instead of the total aircharge dilution being compared to the dilution threshold. The following methods described below may then use these equivalent EGR values to adjust engine operating parameters.

At 212, the method includes determining if the total aircharge dilution is greater than the dilution threshold. If the total aircharge dilution is not greater than the dilution threshold, the method continues on to adjust the throttle based on torque demand and the total aircharge dilution. Said another way, if the total aircharge dilution (or equivalent EGR rate) is less than the dilution threshold (or equivalent EGR threshold), the throttle is adjusted to deliver the aircharge for the torque demand, based on the aircharge dilution (or equivalent EGR rate). As the total aircharge dilution increases, the throttle may be opened by a larger amount to increase the aircharge and deliver the demanded torque. At 214, the method may further include adjusting spark timing based on the total aircharge dilution. In one example, adjusting spark timing includes advancing spark timing when the total aircharge dilution level is over a threshold and a pedal position is increasing (e.g., during a tip-in). In another example, adjusting spark timing includes advancing spark timing when the total aircharge dilution level is over the threshold and the pedal position, torque demand, or aircharge is below a threshold position.

Alternatively at 212, if the total aircharge dilution is greater than the dilution threshold, the method continues on to 216 to adjust the throttle based on the dilution threshold and torque demand and not based on the total aircharge dilution. In some examples, when the total aircharge dilution is greater than the threshold dilution, the output of the oxygen sensor may be clipped, or limited, to the threshold dilution. As such, the throttle position may be adjusted based on the threshold dilution, the threshold dilution less than the total aircharge dilution. Since water droplets may not contribute to the partial pressure of the aircharge, the throttle may be adjusted based on dilution threshold rather than total dilution level (which includes water droplets). As a result, the throttle may adjust airflow to the engine to deliver to desired torque without overestimating the required airflow.

In some examples, the methods at 216 and 214 may further include adjusting the EGR valve based on the total aircharge dilution or equivalent EGR rate based on the output of the intake oxygen sensor. For example, if the estimated EGR rate from the oxygen sensor is greater than the target (e.g., desired) EGR rate, the closed loop controller may reduce the opening of the EGR valve. If the total air charge dilution is greater than the dilution threshold, the EGR valve may be adjusted based on the equivalent EGR threshold (equivalent to the dilution threshold).

In this way, an engine method comprises adjusting a position of a throttle based on a dilution threshold when a total aircharge dilution level is greater than the dilution threshold, the total dilution aircharge level based on an output of an intake oxygen sensor. In one example, the oxygen sensor is positioned in an intake manifold, downstream of a charge air cooler and upstream of the throttle.

The dilution threshold is based on a saturation vapor pressure at a throttle inlet temperature when exhaust gas recirculation is not flowing. Additionally, the dilution threshold is further based on a target exhaust gas recirculation rate when exhaust gas recirculation is flowing. The method may further include adjusting spark timing based on the total aircharge dilution level. For example, even if the total aircharge dilution level is greater than the dilution threshold, the spark timing is adjusted based on the total aircharge dilution level and not the dilution threshold. In one example, adjusting spark timing includes advancing spark timing when the total aircharge dilution level is over a threshold and a pedal position is increasing and retarding spark timing when the total aircharge dilution level is over the threshold and the pedal position is below a threshold position.

The method further includes adjusting the position of the throttle based on the total aircharge dilution level when the total aircharge dilution level is less than the dilution threshold. In one example, adjusting the position of the throttle includes increasing an opening of the throttle as the total aircharge dilution level increases. The method further includes adjusting the position of the throttle based on a torque demand.

FIG. 3 shows a graphical example of adjusting a throttle position and spark timing based on an intake oxygen sensor output. Specifically, graph 300 shows changes in oxygen sensor output (e.g., intake oxygen concentration) at plot 302, changes in total aircharge dilution (based on the oxygen sensor output) at plot 304, changes in a dilution threshold at plot 306, changes in estimated EGR (based on the oxygen sensor output) at plot 308, changes in a position of an EGR valve at plot 310, changes in actual throttle position at plot 312, changes is throttle position based on total aircharge dilution alone at plot 314, changes in spark timing at plot 316, changes in throttle inlet temperature at plot 318, changes in a target EGR flow rate at plot 320, and changes in torque demand at plot 322. As discussed above, the dilution threshold is based on a saturation vapor pressure at the throttle inlet temperature. The dilution threshold is further based on a target EGR rate when an EGR valve is open and EGR is flowing. Additionally, the total aircharge dilution and estimated EGR may both be substantially the same and based on the output of the intake oxygen sensor (e.g., based on the decrease in intake oxygen from a base or expected oxygen concentration). However, when EGR is not flowing, the estimated EGR may be an equivalent EGR based on the total dilution from water vapor and water droplets. Additionally, the position of the EGR valve is shown at plot 310 as being either open or closed. However, in alternate embodiments, the EGR valve may be adjusted into a plurality of positions between fully open and fully closed.

Prior to time t1, the oxygen sensor output is at a first level indicating an intake oxygen content (e.g., concentration) in the aircharge. The total aircharge dilution is low and below the threshold dilution (plots 304 and 306). Further, the threshold dilution is based on the saturation vapor pressure at the throttle inlet temperature (plot 318) and not on EGR since the EGR valve is closed (plot 310). At time t1, the throttle inlet temperature increases (plot 318). As a result, the saturation vapor pressure may increase, thereby increasing the dilution threshold (plot 306). Additionally, the total aircharge dilution (plot 304) and estimated EGR (plot 308) increase between time t1 and time t2. Since the actual EGR remains off (e.g., not flowing), the increase in dilution and decrease in intake oxygen (plot 302) may be due to water being released into the aircharge from the CAC.

At time t2, the total aircharge dilution increases above the threshold dilution (plots 304 and 306). This indicates the presence of liquid droplets in addition to water vapor. In response, between time t2 and time t3, the controller adjusts the throttle position (plot 312) based on the dilution threshold (plot 306) instead of the total aircharge dilution (or instead of the estimated EGR). Plot 314 shows the throttle position adjustment if it were based on the total aircharge dilution. The throttle adjustment based on the total aircharge dilution (plot 314) results in a larger throttle opening (and increased airflow to the engine) than the throttle adjustment based on the dilution threshold (plot 312) between time t2 and time t3. Water droplets in the aircharge may cause the total aircharge dilution and estimated EGR to be higher than the actual dilution of the aircharge that affects torque delivery. Thus, if the throttle had been adjusted based on the total aircharge dilution between time t2 and t3, the aircharge into the cylinders may be higher than needed to deliver the requested torque.

Since water droplets in the aircharge may affect combustion, the controller adjusts spark timing based on the total aircharge dilution between time t2 and time t3. Specifically, in response to the increased total aircharge dilution, the controller retards spark between time t2 and time t3 (plot 316). At time t3, the total aircharge dilution advances below the dilution threshold, thereby resulting in again adjusting the throttle based on the total aircharge dilution instead of the threshold dilution.

Just before time t4, the target EGR rate increases (plot 320). As a result, at time t4, the EGR valve opens to increase EGR flow to the target EGR rate (plot 310). Since EGR is flowing after time t5, the dilution threshold is based on the saturation vapor pressure at the throttle inlet temperature and the target EGR. As the EGR flow increases, the dilution threshold (plot 306) and the total aircharge dilution (plot 304) increases. Between time t4 and time t5, condensation may be forming within the CAC. Just before time t5, water may be released from the CAC. As a result, the total aircharge dilution increases above the dilution threshold at time t5. In response, the controller transitions from adjusting the throttle based on the total aircharge dilution and torque demand before time t5 to adjusting the throttle based on the dilution threshold and torque demand after time t5. Alternatively, if the controller continued to adjust the throttle based on the total aircharge dilution after time t5, the throttle may be opened by a large amount, causing a larger amount of aircharge to enter the cylinder. This larger amount of aircharge may be overestimated for the torque demand since water droplets from the CAC are accounting for at least part of the total aircharge dilution level. In some examples, this may result in a larger torque output than requested.

As shown before time t2 and between time t3 and time t5 in FIG. 3, during a first condition when a total aircharge dilution level is less than a dilution threshold, a controller may adjust a throttle based on the total aircharge dilution level. During a second condition, as shown between time t2 and time t3 and after time t5, when the total aircharge dilution level is greater than the dilution threshold, the controller may adjust the throttle based on the dilution threshold, the total aircharge dilution level based on an output of an intake oxygen sensor. In one example, the intake oxygen sensor is positioned in an engine intake, downstream of the charge air cooler.

The dilution threshold is based on a vapor pressure threshold at the intake oxygen sensor, the vapor pressure threshold based on a temperature proximate to the intake oxygen sensor. In one example, the temperature is a throttle inlet temperature. Further, as shown before time t4, the dilution threshold may be estimated based on the vapor pressure threshold when exhaust gas recirculation is not flowing. Alternatively, as shown after time t4, the dilution threshold may be estimated based on the vapor pressure threshold and a target exhaust gas recirculation rate when exhaust gas recirculation is flowing.

In one example adjusting the throttle during the first condition includes increasing an opening of the throttle as the total aircharge dilution level increases. Adjusting the throttle is further based on torque demand. Additionally, spark timing may be adjusted based on the total aircharge dilution level during both the first condition and the second condition.

In this way, an intake throttle may be adjusted based on an output of an intake oxygen sensor and a dilution threshold. In one example, the output of the intake oxygen sensor may be used to determine a total aircharge dilution level (e.g., a decrease in intake oxygen due to diluents in the aircharge). In some examples, the output of the intake oxygen sensor may be used to determine an EGR rate when EGR is flowing or an estimated equivalent EGR rate (similar to the total aircharge dilution) when EGR is not flowing. The dilution threshold may be based on a saturation vapor pressure at throttle inlet conditions and a target EGR rate (if EGR is flowing). As such, the dilution threshold may be a maximum aircharge dilution level, not including dilution from water droplets in the aircharge. Thus, when the total aircharge dilution increases above the dilution threshold, water droplets may be traveling in the airflow to the engine. As such, a controller may adjust the throttle opening based on the dilution threshold instead of the total aircharge dilution when it is determined that water droplets are in the charge air flow. Adjusting the throttle is this way may achieve a technical effect of delivering a required amount of aircharge for the torque demand. As a result, the requested torque demand may be delivered without decreasing engine efficiency.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-3, I-4, I-6, V-12, opposed 4, and other engine configurations. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine system, comprising:
   an intake manifold;
   a charge air cooler positioned in an intake passage upstream of the intake manifold;
   an intake throttle coupled to the intake manifold downstream of the charge air cooler;
   an exhaust gas recirculation (EGR) system including a passage for recirculating exhaust residuals from an exhaust passage to an intake passage via an EGR valve;
   an oxygen sensor coupled to the intake passage downstream of the charge air cooler and upstream of the intake throttle; and
   a controller with computer readable instructions for:
      determining a total aircharge dilution using an output of the oxygen sensor, where the total aircharge dilution is a measure of one or more diluents in an aircharge;
      determining a dilution threshold based on a saturation vapor pressure of water; and
      adjusting a position of the intake throttle based on the total aircharge dilution relative to the dilution threshold;
   where during a first operating condition, the one or more diluents include EGR gas; and
   where during a second operating condition, the one or more diluents include one or more of water vapor and water droplets.

2. The engine system of claim 1, wherein the position of the intake throttle is adjusted when the total aircharge dilution is less than the dilution threshold.

3. The engine system of claim 1, wherein the position of the intake throttle is adjusted when the total aircharge dilution is greater than the dilution threshold.

4. The engine system of claim 1, wherein the dilution threshold is based on the saturation vapor pressure at intake throttle inlet conditions downstream of the charge air cooler and upstream of the intake throttle and a target EGR flow rate when the EGR valve is open and based on only the saturation vapor pressure at the intake throttle inlet conditions when the EGR valve is closed.

5. The engine system of claim 4, wherein the intake throttle inlet conditions include a temperature downstream of the charge air cooler and upstream of the intake throttle.

6. The engine system of claim 1, where the controller includes computer readable instructions for adjusting a spark timing based on the total aircharge dilution and wherein the adjusting spark timing includes advancing the spark timing when the total aircharge dilution is over a threshold and a pedal position is increasing.

* * * * *